Jan. 16, 1962     H. J. WOLLNER     3,016,749

TOOL FOR SAMPLING BATCHES OF FIBROUS MATERIAL

Filed Dec. 11, 1957

INVENTOR.
HERBERT J. WOLLNER
BY Roberts, Cushman & Grover
ATT'YS.

United States Patent Office 3,016,749
Patented Jan. 16, 1962

3,016,749
TOOL FOR SAMPLING BATCHES OF
FIBROUS MATERIAL
Herbert J. Wollner, Belmont, Mass., assignor to ACH
Fiber Service, Inc., a corporation of Massachusetts
Filed Dec. 11, 1957, Ser. No. 702,167
1 Claim. (Cl. 73—425)

This invention relates to apparatus for extracting samples of wool or other fibrous material from bags or bales or other batches of wool or other fibrous material, and has for its objects to provide apparatus which is simple and economical in construction, which does not disturb the composition of the material at the location where the sample is extracted so that the extracted sample accurately represents the composition of the material, which need not be pushed against batches of material in taking samples and which is durable and reliable in use.

According to the present invention the apparatus comprises an extractor and means for forcing the extractor into a batch of material to remove a sample of the material at a selected location, including means for attaching the tool to the batch at a location offset from the sampling location so that the attaching means does not disturb the material at the sampling location. Preferably the tool also comprises means for moving the attaching means relatively to the extractor so as to attach the tool to the batch before the extractor enters the material. Preferably the extractor is in the form of a cutter which is similar to those now in common use for coring fibers, it may or may not have a tapered tip, and has a smooth edge in contradistinction to a serrated edge, so that it does not stir the material and thereby alter the composition of the core which is extracted.

In a more specific aspect the tool comprises cutting means and mechanism for forcing the cutting means into a batch of material to cut a core of the material at a selected coring location, including attaching means for attaching the tool to the batch at a location offset from the coring location so that the attaching means does not disturb the material at the coring location, one of the aforesaid means comprising two or more parts offset in different directions from the other means to balance the opposing forces of the two means. For example the attaching means may be in the middle and the cutting means on opposite sides thereof, or vice versa.

For the purpose of illustration typical embodiments of the invention are shown in the accompanying drawings in which.

Figure 1:
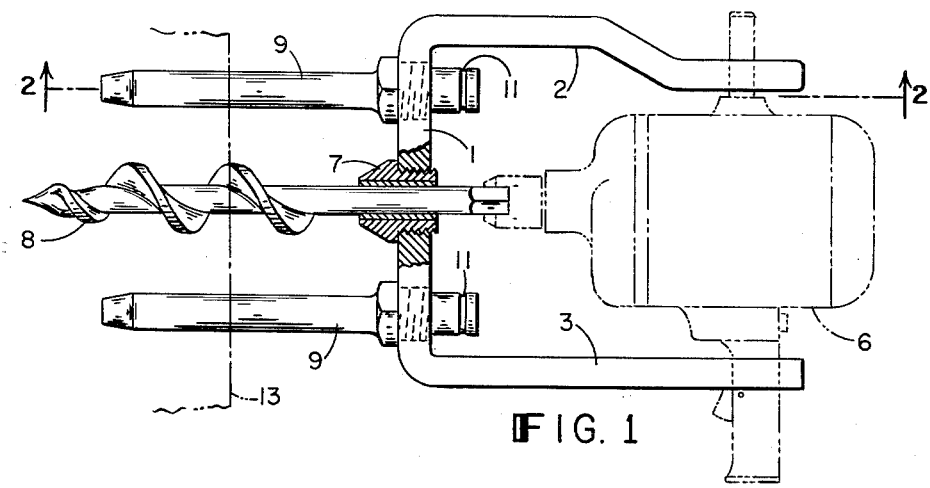
FIG. 1 is a side view of one embodiment with parts in section.
Figure 2:
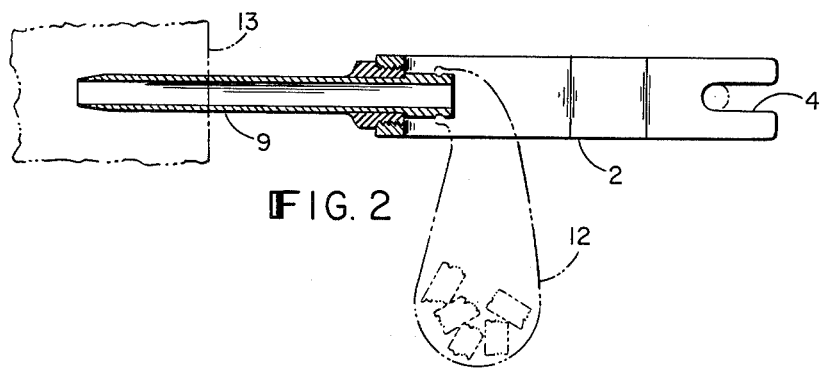
FIG. 2 is a section on line 2—2 of FIG. 1.

The particular embodiment of the invention shown in FIGS. 1 and 2 comprises a U-shaped frame having a cross-part 1 and two legs 2 and 3 which have notches 4 in their free ends to receive the handles of a portable drill such as shown in broken lines at 6 in FIG. 1. Threaded through the frame at the center of the cross-piece 1 is a bearing 7 for rotatably supporting an auger 8. Mounted in the cross-piece 1 on opposite sides of the bearing 7 are two tubular cutters 9 having smooth cutting edges at their outer ends and having grooves 11 or other means for detachably mounting bags or other containers as indicated by broken lines 12 in FIG. 2. The auger may be driven in any suitable manner but preferably by a portable drill such as indicated at 6 with a chuck which firmly grips the rear end of the auger.

To sample a batch of material, such as a bale of wool indicated by broken lines 13 in FIGS. 1 and 2, the tip of the auger is presented to the bale and as it enters the bale it automatically pulls the tubular cutters 9 into the bale, instead of requiring the operator to push the cutters into the bale. As shown in FIG. 1 the auger projects beyond the tips of the cutters so that it is firmly attached to the bale before the cutters enter the bale. By locating the cutters on opposite sides of the auger equidistantly therefrom, the outward forces on the cutters due to the resistance of the material balance each other about the central auger so that there is no tendency for the tool to tip sidewise. Inasmuch as the frame is subjected to a pulling force by the auger and pushing forces by the cutters the drill is held in the notches 4 during operation without any latching means.

Figures 3, 4, 5:
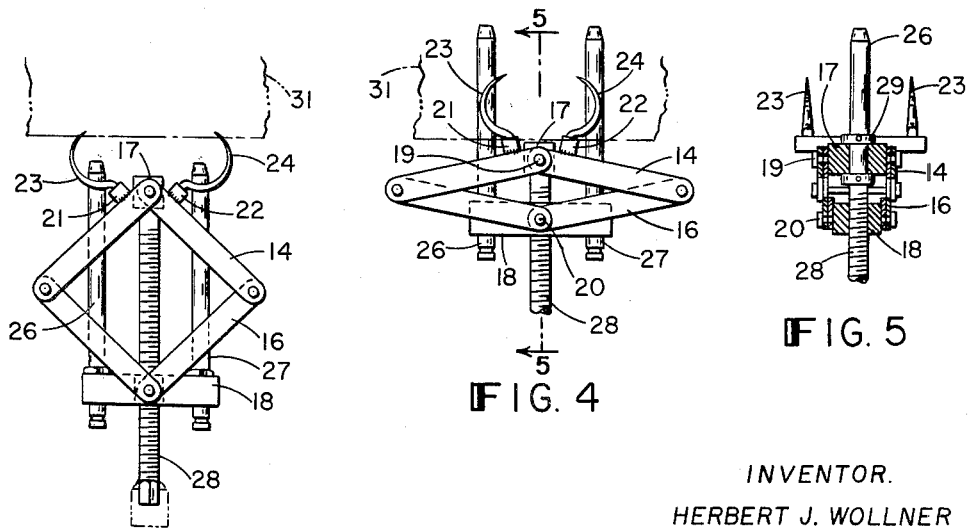
FIG. 3 is a side view of another embodiment in normal condition.
FIG. 4 is a similar view in attached position.
FIG. 5 is a section on line 5—5 of FIG. 4.

The modification shown in FIGS. 3, 4 and 5 comprises a lazy tong having two pairs of arms 14 and 16 pivoted on blocks 17 and 18 at 19 and 20. Fast to the arms 14 on opposite sides of the block 17 are cross-pieces 21 and 22 on the outer ends of which are mounted two pairs of hooked tongs 23 and 24 which hook toward each other. Mounted on the block 18 are two tubular cutters 26 and 27 which project midway between the hooked tongs of each pair 23 and 24. Threaded through the block 18 is a screw 28, the inner end of which is rotatably journaled in the block 17 as indicated at 29 in FIG. 5. The screw 28 may be operated by hand or by motor by applying a suitable driver to the outer end of the screw.

To sample a bale of wool or the like such as indicated by broken lines 31 in FIGS. 3 and 4, the lazy tongs 14—16 are expanded to the condition shown in FIG. 3 and the hooked tongs 23 and 24 are presented to the material. As the screw 18 collapses the lazy tong to the condition shown in FIGS. 4 and 5 the hooked tongs 23 and 24 first grasp the bale and then the cutters 26 and 27 enter the bale to cut two cores. Then when the lazy tong is expanded to the condition shown in FIG. 3 the cutters pull out of the bale with the cores remaining therein and the hooked tongs 23 and 24 also pull out of the bale. While the cores may be removed from the tubular cutters with a rod or the like, ordinarily they are removed by succeeding cores in taking subsequent samples.

It should be understood that the present disclosure is for the purpose of illustration only and that this invention includes all modifications and equivalents which fall within the scope of the appended claim.

I claim:

For sampling a batch of fibrous material, a tool comprising cutting means for cutting a core of the material at a selected location and attaching means for attaching the tool to the batch at a location offset from said seleced location, and means for conjointly actuating said cutting means and attaching means to apply opposing forces thereto, the attaching means projecting beyond the cutting means so that the attaching means first anchors the tool to the batch and the cutting means then cuts the core, one of said first two means comprising a plurality of parts offset in different directions from the other of the first two means to balance the opposing forces of the first two means, and said attaching means comprising a pair of hooked tongs.

References Cited in the file of this patent

UNITED STATES PATENTS

| | | |
|---|---|---|
| 2,083,418 | Andrews | June 8, 1937 |
| 2,084,686 | Howard | June 22, 1937 |
| 2,753,717 | Obrcian | July 10, 1956 |
| 2,834,212 | Wollner | May 13, 1958 |